United States Patent
Bethune

Patent Number: 5,887,774
Date of Patent: Mar. 30, 1999

[54] EXERCISE FLUID BOTTLE

[76] Inventor: Peter R. Bethune, 51 Petrel Avenue, Mermaid Beach, Queensland 4218, Australia

[21] Appl. No.: 690,156

[22] Filed: Apr. 23, 1991

Related U.S. Application Data

[63] Continuation of Ser. No. 725,898, Apr. 22, 1985, abandoned, which is a continuation of Ser. No. 572,359, Jan. 20, 1984, abandoned.

[51] Int. Cl.$^6$ .................................................. B60R 11/00
[52] U.S. Cl. .......................... 224/414; 224/401; 224/406; 224/425; 224/460; 224/463; 224/901.4; 215/383; 215/384; 215/399; 220/475
[58] Field of Search ..................................... 224/148, 273, 224/901, 30 R, 30 A, 32 R, 35, 39, 41, 401, 406, 407, 409, 414, 419–421, 425, 426, 431, 460, 463, 901.4; D9/539, 557; 215/100 R, 100 A, 382, 383, 384, 399; 220/475, 751

[56] References Cited

U.S. PATENT DOCUMENTS

| | | |
|---|---|---|
| D. 23,352 | 6/1894 | Juhring . |
| D. 072,961 | 6/1927 | Mas ........................................... D9/557 |
| D. 196,148 | 8/1963 | Sterges ...................................... D9/539 |
| D. 209,715 | 12/1967 | Ninesling et al. ........................ D9/539 |
| D. 214,158 | 5/1969 | Pettengill . |
| D. 214,305 | 6/1969 | Hills . |
| 0,596,998 | 1/1898 | Hawkins et al. ....................... 224/32 R |
| 2,504,738 | 4/1950 | Shields .................................... 224/148 |
| 3,599,845 | 8/1971 | Miller ...................................... 222/525 |
| 3,738,545 | 6/1973 | Roy ......................................... 222/525 |
| 3,741,429 | 6/1973 | Purcell, Jr. et al. ............... 224/30 R X |
| 3,920,140 | 11/1975 | Kiser ................................... 215/100 R |
| 4,176,770 | 12/1979 | Griggs et al. ......................... 224/30 A |
| 4,368,827 | 1/1983 | Thompson .......................... 215/100 A |
| 4,441,638 | 4/1984 | Shimano .................................. 224/35 |

Primary Examiner—J. Casimer Jacyna
Attorney, Agent, or Firm—W. Edward Johansen

[57] ABSTRACT

The present invention is an exercise fluid bottle which contains a liquid nourishment and which is used by a user during a strenuous physical activity. The exercise fluid bottle includes an integral container formed out of a plastic material and a dispensing cap for retaining and dispensing the liquid nourishment. The integral container has a first portion which is a hollow cylinder with an enclosed end and a partially enclosed end and a second portion which is a hollow cylinder with an enclosed end and a partially enclosed end. The integral container also has a handle portion which is a hollow cylinder which has corrugated ribbing axially aligned therewith so that the user can more comfortably grip the exercise fluid bottle and which is disposed adjacent to the partially enclosed ends of the first and second portions. The dispensing cap is fluidly and mechanically coupled to the enclosed end of the first portion. Each of the first and second portions has a first groove of a first diameter, which is equal to the diameter of a ski pole in order to receive the ski pole and a second groove of a second diameter, which is equal to the diameter of a boom of a wind-surfing apparatus in order to receive either the frame pipe or the boom. A VELCRO strap fixedly, but detachably, couples the exercise fluid bottle to either the ski pole or the boom.

1 Claim, 1 Drawing Sheet

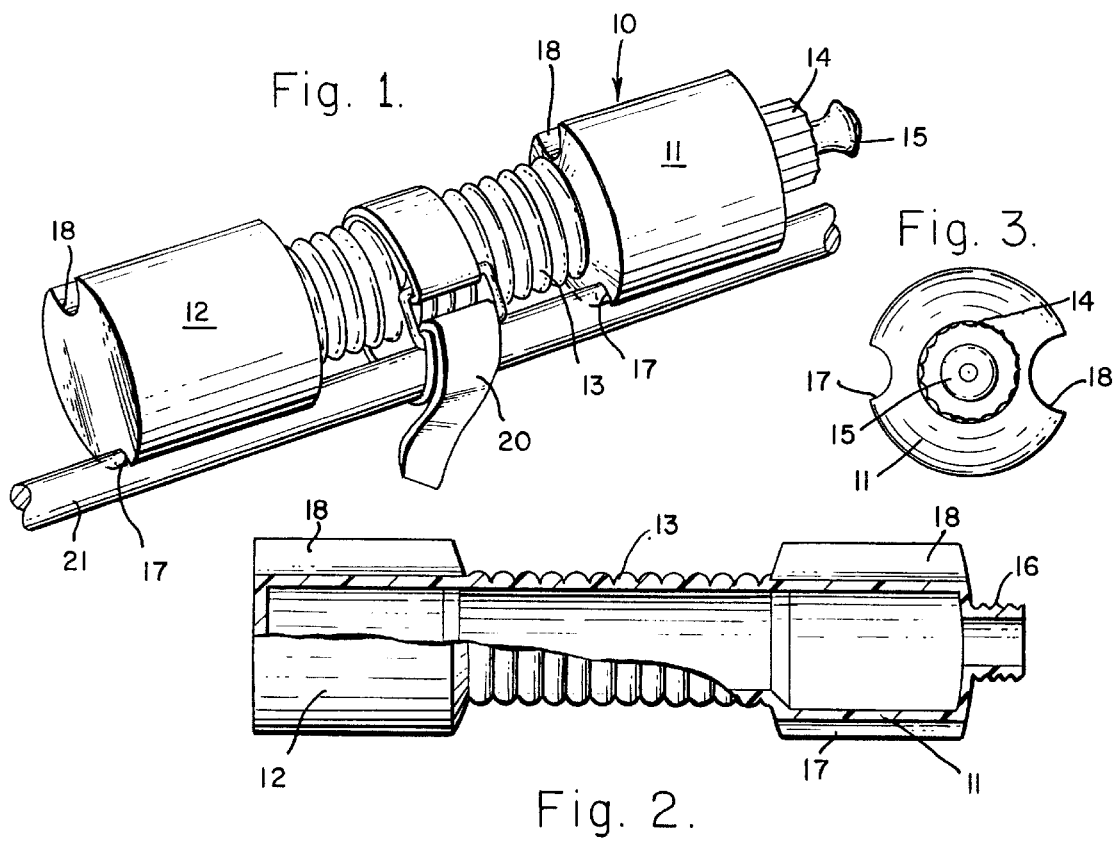
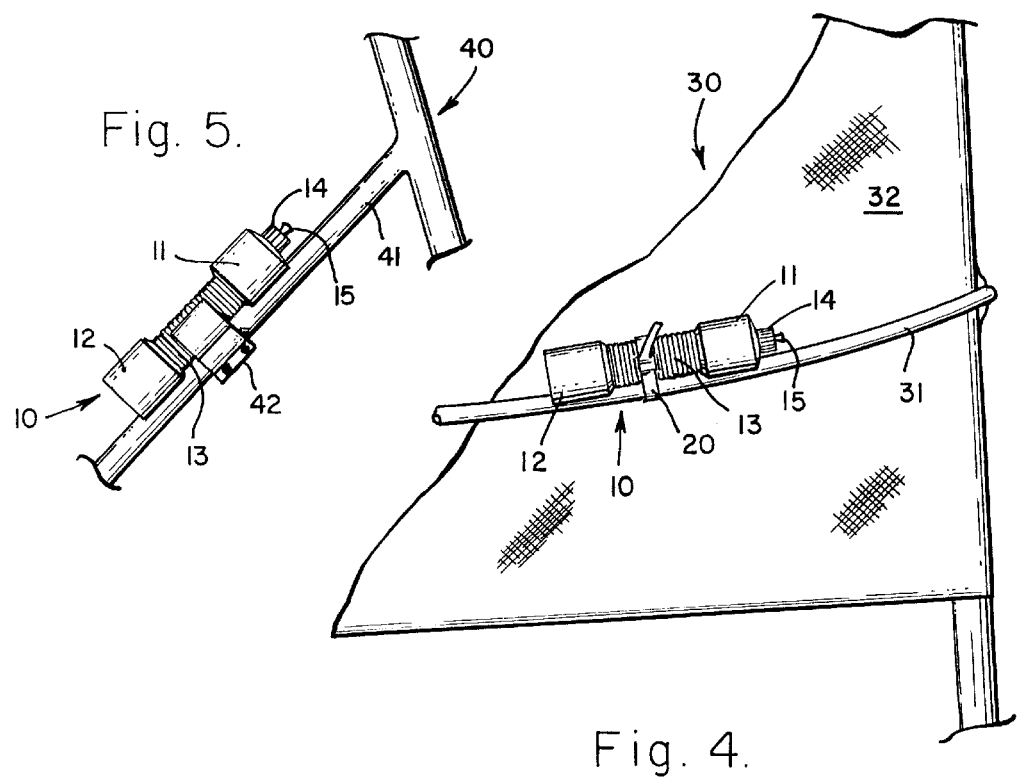

5,887,774

EXERCISE FLUID BOTTLE

This application is a continuation of an application filed Apr. 22, 1985 Ser. No. 06/725,898 now abandoned, which is a continuation of an application filed Jan. 20, 1984, Ser. No. 06/572,359, now abandoned.

BACKGROUND OF THE INVENTION

1. Field of the Invention

The present invention relates to an exercise fluid bottle which may contain water or other liquid nourishment which an individual who is training in a strenuous physical activity needs to ingest in order to prevent dehydration during his training, and more particularly a training bottle which the individual is not only able to conveniently carry during his training, but which also provides aerobic exercise to him.

2. Description of the Prior Art

During strenuous physical activity, such as jogging, hiking, bicycle and motorcycle trail riding, horseback riding and the like, most medical doctors recommend that the participant ingest liquid in order to prevent dehydration. Typically, water or other liquid nourishment is carried or worn on the body in containers. Many participants rely on canteen, plastic bottles, boda bags and other similar liquid containers to hold their supply of such liquid during physical activity.

All of these liquid containers are inconvenient to carry in that they are often bulky in shape and are worn on a waist belt or a shoulder strap, or otherwise attached to the clothing or body of the participant. When so carried the liquid container and its attachment frequently interferes with activity by its position on or near the waistline, under the arm or elsewhere on the body.

U.S. Pat. No. 4,265,381, entitled Beverage and Liquified Food Belt, issued to Steven C. Muscatell on May 5, 1981, teaches a belt for carrying beverages and liquified food for consumption during a strenuous physical activity.

Bicycle riding has become very popular for transportation, recreation and exercise. Like all vigorous physical activities, bicycle riding makes the participant thirsty, and he will often want to have a few swallows of a refreshing beverage. Accordingly, many riders will take a beverage bottle with them on the bicycle, especially if they are going on a long ride. Often, the rider will prefer not to stop to take a drink. In that case it is desirable the beverage bottle be readily accessible and convenient to open. If not, the rider may be distracted from proper operation of the bicycle in the course of either removing the beverage bottle in order to drink from it or replacing it after having a drink from it thereby exposing him to some risk of an accident.

U.S. Pat. No. 4,345,704, entitled Bottle Mount and Bottle for Bicycles, issued to Matthew S. Boughton on Aug. 24, 1982, teaches a bottle mount and a bottle for bicycles. The bottle mount includes a mount for attachment to the bicycle having a concave surface that is a segment of a surface of revolution of a substantially straight line of not more than about 180 degrees in circumferential extent. The bottle has an external surface that is complementary to a concave surface of the bottle mount. The concave surface of the bottle mount and the complementary surface of the bottle have hook and loop cloth fastener elements affixed to them. A beverage in the bottle is discharged through a valved dispenser that is designed to be opened using the teeth.

U.S. Pat. No. 4,384,714, entitled Weighted Cuff Exercising Device, issued to Akira Kimura on May 24, 1983, teaches a training aid for drilling arm and/or foot muscles of a user which includes a main body made of soft and flexible material in the form of a thick tubular member having a substantially C-shaped cross-section in its construction. Major surface of the main body are smooth. The thick tubular member is substantially uniform thickness throughout its length. A plurality of elongated holes are formed in the main body and between its major surfaces. The holes extend in a longitudinal direction in the main body and are parallel with each other. The holes extend substantially the full length of the thick tubular member. A plurality of rod like members each made of heavy metal and having a length substantially equal to the depth of the holes and a diameter which is slightly larger than the inner diameter of each hole. The rod like members are detachably inserted in the holes. A VELCRO fastening strap is secured to the main body for detachably mounting the training aid around the wrist or ankle of the user.

U.S. Pat. No. 4,407,497, entitled Weighted Exercise Suit, issued to Geysa Gracie on Oct. 24, 1983, teaches a weighted exercise suit which is designed to enable human users to exercise with added weights removably attached to a body suit. Specifically, it is designed incorporating two weight strips that are removably attached to the suit over the shoulders. Each strip contains separate compartment which hold weights, the amount of which is regulated by the user. Furthermore, the weighted exercise suit is designed to provide for a balanced and symmetrical distribution of weight from front to back and from side to side over the upper body, rather than having the weight placed solely on the lower body.

U.S. Pat. No. 4,247,097, entitled Variable Weight Aerobic Exercise Glove, issued to Leonard Schwartz on Jan. 27, 1981, teaches a variable weight aerobic exercise glove. Aerobic exercise is highly effective in training the body, i.e., heart muscle and skeletal muscle ensemble, to utilize oxygen at a higher rate. As a result, running jogging and walking have taken on a new dimension in the world of physical fitness. By encumbering his limbs, one may augment to a surprising degree the training effect of his aerobic exercise.

SUMMARY OF THE INVENTION

In view of the foregoing factors and conditions which are characteristic of the prior art it is the primary object of the present invention to provide an exercise fluid bottle which may contain water or other liquid nourishment which an individual who is training in a strenuous physical activity needs to ingest in order to prevent dehydration during his training.

It is another object of the present invention to provide an exercise fluid bottle which the individual is not only able to conveniently carry during his training, but which also provides aerobic exercise to him.

In accordance with the present invention an embodiment of an exercise fluid bottle which contains a liquid nourishment and which is used by a user during a strenuous physical activity is described. The exercise fluid bottle includes an integral container formed out of a plastic material and a dispensing cap for retaining and dispensing the liquid nourishment. The integral container has a first portion which is a hollow cylinder with an enclosed end and a partially enclosed end and a second portion which is a hollow cylinder with an enclosed end and a partially enclosed end. The integral container also has a handle portion which is a hollow cylinder which has corrugated ribbing axially aligned therewith so that the user can more comfortably grip the exercise fluid bottle and which is disposed adjacent to the partially enclosed ends of the first and second portions. The dispensing cap is fluidly and mechanically coupled to the enclosed end of the first portion. The handle portion fluidly and mechanically couples the first portion to the second portion wherein the diameter of the handle portion is smaller than the diameter of the first and second portion. Each of the first and second portions has a first groove of a first diameter, which is equal to the diameter of a ski pole in order to receive the ski pole and a second groove of a second diameter, which is equal to the diameter of a boom of a wind-surfing apparatus in order to receive either the frame pipe or the boom. A VELCRO strap fixedly, but detachably, couples the exercise fluid bottle to either the ski pole or the boom.

The features of the present invention which are believed to be novel are set forth with particularity in the appended claims.

other claims and many of the attendant advantages will be more readily appreciated as the same becomes better understood by reference to the following detailed description and considered in connection with the accompanying drawing in which like reference symbols designate like parts throughout the figures.

DESCRIPTION OF THE DRAWING

FIG. 1 is a perspective drawing of an exercise fluid bottle which has been constructed in accordance with the principles of the present invention and which has been secured to the shaft of a ski pole.

FIG. 2 is a side elevational view in partial cross-section of the exercise fluid bottle of FIG. 1.

FIG. 3 is a top plan view of the exercise fluid bottle of FIG. 1.

FIG. 4 is a schematic view of a sail, a mast, and a, boom of a wind-surfing apparatus with the exercise fluid bottle of FIG. 1 being secured to the boom by a VELCRO strap.

FIG. 5 is a schematic view of a pipe frame of a bicycle with the exercise fluid bottle of FIG. 1 being secured to the pipe frame by a connector mount.

DESCRIPTION OF THE PREFERRED EMBODIMENT

In order to best understand the present invention it is necessary to refer to the following description of its preferred embodiment in conjunction with the accompanying drawing. Referring to FIG. 1 an exercise fluid bottle 10 which contains a liquid nourishment and which is used by a user during a strenuous physical activity, such as skiing. The exercise fluid bottle 10 includes an integral container which is formed out of a plastic material and which has a first portion 11, a second portion 12 and a handle portion 13. The first and second portions 11 and 12 are hollow cylinders each of which has an enclosed end and an partially enclosed end. The handle portion 13 is a hollow cylinder and is disposed adjacent to the partially enclosed ends of the first and second portions 11 and 12.

Referring to FIG. 2 in conjunction with FIG. 1 and FIG. 3 the handle portion 13 fluidly and mechanically couples the first portion 11 to the second portion 12. The diameter of the handle portion 13 is smaller than the diameter of each of the first and second portions 11 and 12. The handle portion 13 has corrugated ribbing axially aligned therewith so that the runner can more comfortably grip the exercise fluid bottle while he is carrying it. The exercise fluid bottle 10 also includes a dispensing mechanism 14 with a retaining cap 15, which retains the liquid nourishment in the exercise fluid bottle 10, for dispensing the liquid nourishment. The dispensing mechanism 14 is fluidly and mechanically coupled to the enclosed end of the first portion 11 by a threaded neck 16. Each of the first and second portions 11 and 12 has a first groove 17 of a first diameter and a second groove of a second diameter. The integral container may also be formed out of a thin sheet of metal.

Referring again to FIG. 1 the exercise fluid bottle 10 further includes a VELCRO strap 20. The first diameter of the first groove 17 is equal to the diameter of a ski pole 21 and can receive the ski pole 21. The VELCRO strap 20 may be disposed adjacent to the handle portion 13 in order to fixedly, but detachably, couple the exercise fluid bottle to the ski pole 21.

U.S. Pat. No. 3,487,800, entitled Wind-Propelled Apparatus, issued to Hoyle Schweitzer and James Drake on Jan. 6, 1970, teaches a wind-surfing apparatus 30 which includes a mast which is universally mounted on a craft and which supports a boom 31 and a sail 32. The position of the mast and sail is controllable by the user on the craft, but the mast is substantially free from pivotal restraint in the absence of such control. The wind-propelled apparatus may also include a pair of curved booms, which are arcuately athwart the mast. Wind-surfing has proved to be popular outdoor sport, but it is limited to lakes, large rivers or the ocean.

Referring to FIG. 4 the second diameter of the second groove 18 is equal to the diameter of a boom 31 of a wind-surfing apparatus 30 in order to receive the boom. The VELCRO strap 20 is disposed adjacent to the handle portion in order to fixedly, but detachably, couple the exercise fluid bottle to the boom 31.

Referring to FIG. 5 a bicycle 40 has a frame 41. The second diameter of the second groove 18 is equal to the diameter of the frame pipe 41 of the bicycle 40 in order to receive the frame pipe 41. The exercise fluid bottle 10 further includes a connector mount 42 which is fixedly coupled to the frame pipe 41. The connector mount 42 is fixedly, but detachably, coupled to the handle portion 13 thereby fixedly, but detachably, coupling the exercise fluid bottle 10 to the frame pipe 41 of the bicycle.

From the foregoing it can be seen that an exercise fluid bottle has been described. It should be noted that the sketches are not drawn to scale and that distance of and between the figures are not to be considered significant.

Accordingly it is intended that the foregoing disclosure and showing made in the drawing shall be considered only as an illustration of the principles of the present invention.

What is claimed is:

1. An exercise fluid bottle which may be filled with a liquid which provides nourishment which an individual may need to ingest in order to prevent dehydration when he is participating in a strenuous physical activity, said exercise fluid bottle comprising:

a. a substantially rigid integral container which is formed out of a plastic material and which has a first portion of a first diameter in the shape of a hollow cylinder having an enclosed end and a partially enclosed end, a second portion of a second diameter, which is equal to said first diameter, in the shape of a hollow cylinder having an enclosed end and a partially enclosed end and a handle portion of a third diameter, which is smaller than said first diameter, in the shape of a hollow cylinder having a pair of open ends, said handle portion being disposed between and adjacent to said partially enclosed ends of said first and second portions in order to fluidly and mechanically couple said first portion to said second portion; and b. dispensing means for retaining the liquid in said exercise fluid bottle and for dispensing the liquid, said dispensing means being fluidly and mechanically coupled to said enclosed end of said first portion of said exercise fluid bottle wherein each of said first and second portions has a first groove of a first diameter which said first groove provides means for attaching the fluid bottle to an elongate rod which is also of said first diameter, and each of said first and second portions further has a second groove of a second diameter which is different from said first diameter which said second groove provides means for attaching the fluid bottle to an elongated rod which is also of said second diameter.

* * * * *